June 4, 1935.  L. J. THOMAS  2,003,658
STRAINER
Filed Aug. 7, 1933
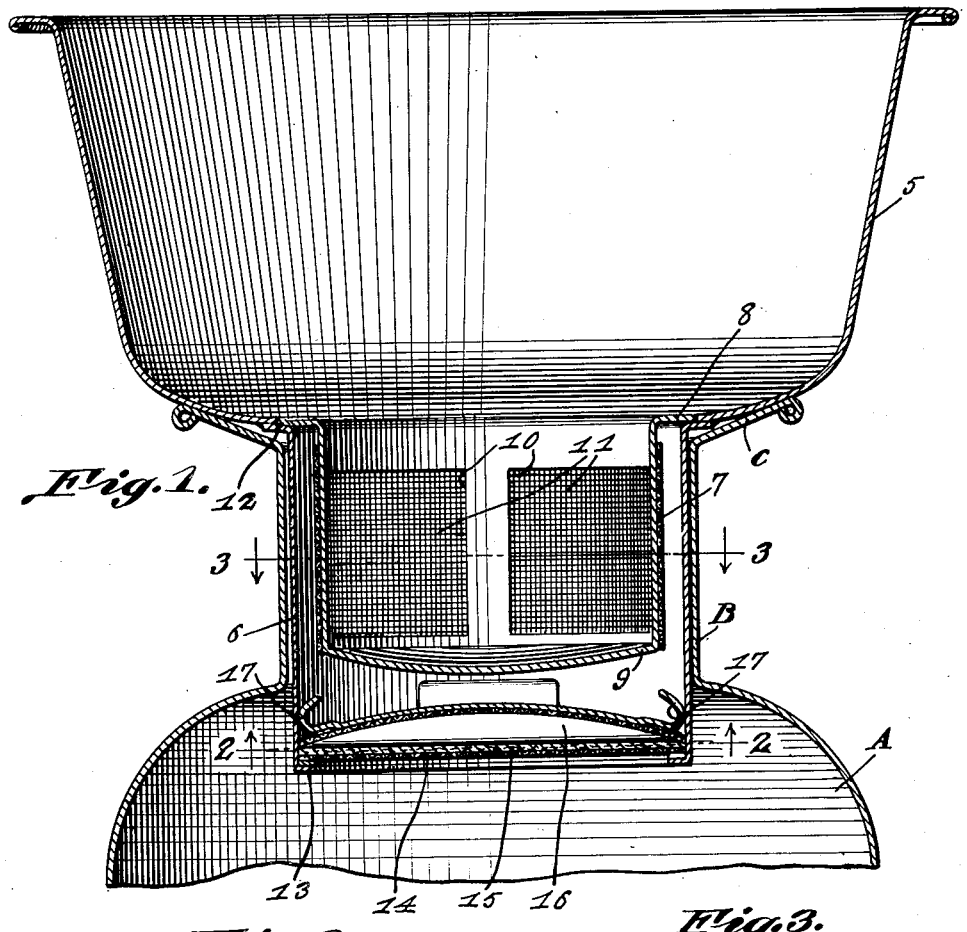
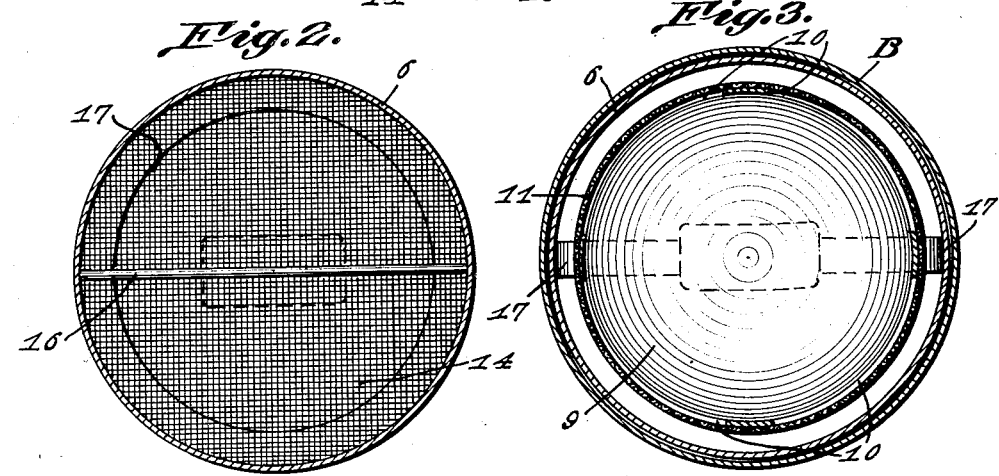
Lawrence J. Thomas, INVENTOR
BY Victor J. Evans & Co.
ATTORNEY Patented June 4, 1935

2,003,658

UNITED STATES PATENT OFFICE 2,003,658

STRAINER

Lawrence J. Thomas, Mount Angel, Oreg.

Application August 7, 1933, Serial No. 684,053

1 Claim. (Cl. 210—159)

The invention relates to a strainer and more especially to a liquid strainer adapted primarily for the straining of milk.

The primary object of the invention is the provision of a strainer of this character, wherein the construction thereof is such that foreign matter, dirt, sediment or the like will be trapped and the liquid delivered thereover into a container without being forced through the trapped substance, thus in this manner assuring a perfect and thorough straining of the liquid, as for example, milk, when being poured into a container.

Another object of the invention is the provision of a strainer of this character, wherein several screens are held so that in the pouring of milk or other liquid the latter will be completely strained with the foreign matter, dirt or sediment entirely removed therefrom and excluded from a container within which the strained milk is received, the strainer being of novel construction and susceptible of insertion in the mouth or neck of a container for the milk.

A further object of the invention is the provision of a strainer of this character which is simple in construction, thoroughly reliable and efficient in its purpose, readily and easily cleaned for sanitary purposes, assuring thorough straining of liquid, such as milk, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary vertical sectional view through a milk container or can showing the strainer constructed in accordance with the invention applied.

Figure 2 is a sectional view on the line 2—2 of Figure 1 looking in the direction of the arrows.

Figure 3 is a sectional view on the line 3—3 of Figure 1 looking in the direction of the arrows.

Similar reference characters indicate corresponding parts throughout the several views in the drawing.

Referring to the drawing in detail, A designates generally a portion of the body of a milk container or can, B its neck and C the outwardly flared mouth rim of the same, the container or can being of standard style.

Insertable in the neck B of the container or can A is the strainer constituting the present invention and comprising a funnel-like body 5 having a cylindrical throat 6, which latter is of a size to conveniently fit within the neck B of the body A and the length of said throat being greater than the extent of the neck B so as to extend downwardly for a slight distance within the body A of the container or can, as will be apparent from Figure 1 of the drawing.

Removably fitted in the throat 6 is a substantially cup-shaped strainer 7 having the outturned annular flange 8 at the upper open end and the dished bottom 9 at the lower end of said strainer. This strainer 7, at intervals, is cut away to provide the spaced openings 10 covered by a wire mesh screen 11 which is exteriorly mounted on said strainer 7 and extends entirely about the same, the openings 10 being above the dished bottom 9 so that when liquid is poured into this strainer 7 all foreign matter, sediment or dirt will gravitate into the dished bottom 9 and the liquid will freely flow thereover laterally through the openings 10 and become strained by the screens 11. The body 5 concentrically with respect to the throat 6 has a seat 12 for the flange 8 of the strainer 7, the latter being of a diameter less than the internal diameter of the throat 6, while the height of said strainer is less than the length of the said throat.

Formed at the free end of the throat 6 is an inturned annular flange 13 constituting a ledge or rest for a filter including the screen 14 and filtering fabric 15, these being held in place by an upwardly bowed member 16 having the springy end pieces 17 which frictionally engage the inner wall of the throat 6, the bowed piece being superposed to rest against the filter mediums before described.

It will be apparent that when the strained milk or other liquid passes through the screens 11 the said milk or liquid flows laterally into the throat 6 and thence downwardly through the filter including the mediums 14 and 15. The bowed member 16 will permit the removal of the filtering mediums 14 and 15 from the throat 6 when it is desired to clean such mediums. The milk or liquid passing from the throat 6 is discharged into the container or can A, as will be apparent.

It will be apparent that when the funnel-shaped body 5 of the strainer has its throat 6 inserted in the neck B of the container or can A this body 5 will rest upon the mouth rim C and the milk or liquid is poured into the body whence it will flow through the strainer 7 and the filter, including the mediums 14 and 15, into the container or can A.

What is claimed is:

A strainer of the character described comprising a funnel-shaped body having a contracted neck provided with an open bottom, an inturned flange formed from said neck and concentric of its open bottom, filtering mediums resting upon said flange and superimposed one upon the other, a bowed member straddling the filtering mediums and having springy end portions frictionally engaging the internal surface of said neck, a removable cup-shaped strainer fitting said neck and of a diameter considerably less than the latter, the said body having an annular seat at the juncture of the neck therewith, and an outturned annular flange on said strainer and fitting said seat to have the upper end of the strainer flush with the inner surface of the said body, the strainer having spaced wire mesh screens fitted therewith.

LAWRENCE J. THOMAS.